(12) United States Patent
Dinh et al.

(10) Patent No.: US 10,819,796 B2
(45) Date of Patent: Oct. 27, 2020

(54) INTERNET OF THINGS CONNECTIVITY PLATFORM

(71) Applicant: EMC IP Holding Company LLC, Hopkinton, MA (US)

(72) Inventors: Hung Dinh, Austin, TX (US); Sudhir Vijendra, Westborough, MA (US); Satish Das, Round Rock, TX (US); Sachin Yadav, Mountain View, CA (US); Reddeppa Kollu, Leander, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 16/242,645

(22) Filed: Jan. 8, 2019

(65) Prior Publication Data
US 2020/0220931 A1 Jul. 9, 2020

(51) Int. Cl.
*H04L 29/08* (2006.01)
*H04L 29/06* (2006.01)
*H04L 12/24* (2006.01)

(52) U.S. Cl.
CPC .......... *H04L 67/12* (2013.01); *H04L 41/5019* (2013.01); *H04L 67/42* (2013.01)

(58) Field of Classification Search
CPC ...... H04L 67/12; H04L 67/42; H04L 41/5019
See application file for complete search history.

(56) References Cited

U.S. PATENT DOCUMENTS

| | | | | |
|---|---|---|---|---|
| 10,554,418 | B2* | 2/2020 | Kshirsagar | H04L 67/02 |
| 2016/0323143 | A1* | 11/2016 | Kim | G06F 9/4411 |
| 2018/0007172 | A1* | 1/2018 | Wang | H04L 67/24 |
| 2018/0270310 | A1* | 9/2018 | Venkatesan | H04L 29/08189 |
| 2019/0334995 | A1* | 10/2019 | Shanmugam | H04L 69/18 |
| 2020/0021586 | A1* | 1/2020 | Schmidt | H04L 12/66 |
| 2020/0021669 | A1* | 1/2020 | Bikumala | H04L 69/08 |
| 2020/0119981 | A1* | 4/2020 | Guthrie | H04L 41/0803 |
| 2020/0233436 | A1* | 7/2020 | Fox | H04L 67/2809 |

OTHER PUBLICATIONS

Curry, Edward, "Middleware for Communications", 2004 John Wiley & Sons, Ltd ISBN 0-470-86206-8 (Year: 2004).*
D. Lund et al., "Worldwide and Regional Internet of Things (IoT) 2014-2020 Forecast: A Virtuous Circle of Proven Value and Demand," International Data Corporation (IDC), May 2014, IDC #248451, 29 pages.

(Continued)

*Primary Examiner* — Davoud A Zand
(74) *Attorney, Agent, or Firm* — Ryan, Mason & Lewis, LLP

(57) ABSTRACT

An apparatus in one embodiment comprises at least one processing platform comprising a plurality of processing devices. The at least one processing platform is configured to establish a connection between a given one of a plurality of Internet of Things (IoT) clients and a given one of a plurality of IoT brokers via a connectivity layer providing the plurality of IoT clients with centralized access to the plurality of IoT brokers, and to exchange data between the given one of the plurality of IoT clients and the given one of the plurality of IoT brokers via the connectivity layer.

20 Claims, 13 Drawing Sheets

(56) References Cited

OTHER PUBLICATIONS

David A. Chappell, "Enterprise Service Bus," Chapter 5 Message Oriented Middleware (MOM), https://www.oreilly.com/library/view/enterprise-service-bus/0596006756/ch05.html, 2004, 1 page.
Wikipedia, "Apache Kafka," https://en.wikipedia.org/wiki/Apache_Kafka, Dec. 2, 2018, 5 pages.
Wikipedia, "Bandwidth Throttling," https://en.wikipedia.org/wiki/Bandwidth_throttling, Nov. 19, 2018, 8 pages.
console.bluemix.net, "Internet of Things Platform," https://console.bluemix.net/docs/services/IoT/iot_platform_client_lib.html#iot_platform_client_lib, Nov. 26, 2018, 6 pages.
Doug Lowe, "How to Diagram Java Classes with UML—Java All-in-One for Dummies, 56th Edition," https://www.dummies.com/programming/java/diagram-java-classes-uml/, 2017, 3 pages.
Wikipedia, "IBM Integration Bus," https://en.wikipedia.org/wiki/IBM_Integration_Bus, Aug. 18, 2018, 8 pages.
Amazon Web Services (AWS), Inc., "Message Broker for AWS IoT," https://docs.aws.amazon.cornhot/latest/developerguide/iot-message-broker.html, Dec. 4, 2018, 1 page.
Wikipedia, "Message-Oriented Middleware," https://en.wikipedia.org/wiki/Message-oriented_middleware, Sep. 11, 2018, 6 pages.
Oracle Corporation, Message-Oriented Middleware (MOM), https://docs.oracle.com/cd/E19316-01/820-6424/aeraq/index.html, 2010, 3 pages.
Wikipedia, "MQTT," https://en.wikipedia.org/wiki/MQTT, Oct. 30, 2018, 5 pages.
hivemq.com, "MQTT—How to Get Started with the Lightweight IoT Protocol," https://www.hivemq.com/blog/how-to-get-started-with-mqtt, Oct. 22, 2014, 12 pages.
hivemq.com, "MQTT Essentials Part 6: Quality of Service 0, 1 & 2," https://www.hivemq.com/blog/mqtt-essentials-part-6-mqtt-quality-of-service-levels, Feb. 16, 2015, 9 pages.
mqtt.org, "MQTT," http://mqtt.org/, 2014, 2 pages.
Donald Bell, "The Class Diagram," https://www.ibm.com/developerworks/rational/library/content/RationalEdge/sep04/bell/index.html, Sep. 15, 2004, 24 pages.

* cited by examiner

300

400

```
public void initialize () {
        try {
        ........
        client = new MqttClient...("tcp://"+iotHost.trim()+":"+
iotPort,InetAddress.getLocalHost().getHostAddress());
    connOpts = new MqttConnectOptions();
    connOpts.setCleanSession(false);
```

FIG. 4 con't

```
if (iotTemphost.equals("DELL"))
{
connOpts.setUserName("mqtt-test");
connOpts.setPassword("mqtt-test".toCharArray());
client.connect(connOpts);
}
else client.connect();

if (client.isConnected())
{
          System.out.println("MQTT client is connected to IoT server: " + iotHost);
}
```

```
} catch(MqttException me)
       {
       System.out.println("reason"+me.getReasonCode()
       System.out.println("msg"+me.getMessage());
       System.out.println("loc"+me.getLocalizedMessage());
       System.out.println("cause"+me.getCause());
       System.out.println("excep"+me);
       me.printStackTrace();

} catch(UnknownHostException ue)

{
       System.out.println("excep"+ue);
              ue.printStackTrace();
       }
}
```

FIG. 6
600

```
try {
            this.iotSystems();
            this.checkQoslevel(message.getQos());
    ....
    //checkQos method is defined as:

public void checkQoslevel(int qos) {
            if ((qos < 0) || (qos > 2)) {
                        throw new IllegalArgumentException();
            }
}
            if (connOpts.getKeepAliveInterval() < 0 ||
connOpts.getKeepAliveInterval()> 600 )
            {
                        System.out.println("KeepAlive out of range
"+connOpts.getKeepAliveInterval());
            //   this.resetkeepAlive();
                        System.exit(0);
            }
if (connOpts.getConnectionTimeout() < 0 ||
connOpts.getConnectionTimeout() > 600 )
            {
            System.out.println("ConnectionTimeout out of range
"+connOpts.getConnectionTimeout());
         //  this.resetConTimeout();
                  System.exit(0);
            }
```

FIG. 6 cont.

```
System.out.println("Message published '"+ messageString +"' to 'iot_pub' ");
            if (client.isConnected())
            {
System.out.println("MQTT client is still connected to" + iotHost);
            }
            else
            {
            System.out.println("MQTT client is disconnected");
            TimeUnit.SECONDS.sleep(2);      // sleep 2 secs
                            this.reConnect();
            if (client.isConnected()) System.out.println("MQTT client is re-connected");
            }
    } catch (Exception e) {
                            e.printStackTrace();
            System.out.println("An unknown exception occured in Recon :" + e.toString());
            }
}
```

```
public void publish (){ try {
message.setPayload(messageString.getBytes());
message.setQos(qos);
client.publish("iot_pub", message)
```

```
public void messageArrived(MqttTopic topic, MqttMessage message) throws
Exception {

System.out.println("| Topic:" + topic.getName());
        System.out.println("| Message:" + new
String(message.getPayload()));
        System.out.println("------------------------");
}
```

*FIG. 9*
900

| |
|---|
| <<Java Class>><br>©DELLIoTPublisher<br>com.dell.iotclient |
| ▲ client: MqttClient<br>▲ connOpts: MqttConnectOptions<br>▲ message: MqttMessage<br>▲ iotPort: int<br>▲ qos: int<br>▲ iotHost: String<br>▲ iotTemphost: String<br>▲ messageString: String<br>▲ iotRabbitmq: String<br>▲ iotIbmmq: String<br>▲ iotMosquitto: String<br>▲ iotHivemq: String<br>▲ waitTime: long<br>▲ prop: Properties<br>▲ properties: Properties |
| ♂ DELLIotPublisher(String)<br>○ initialize():void<br>○ validateIotSystems():void<br>○ publish():void<br>○ reConnect():void<br>○ disConnect():void<br>○ iotSystems():void<br>○ connectionLost(Throwable):void<br>○ connect():void<br>○ getwaitTime():long<br>○ setwaitTime(long):void<br>○ messageArrived(MqttTopic,MqttMessage):void<br>○ checkQoslevel(int):void |

FIG. 10
1000

| <<Java Class>><br>©DELLIoTSubscriber<br>com.dell.iotclient |
|---|
| ▵ client: MqttClient<br>▵ connOpts: MqttConnectOptions<br>▵ message: MqttMessage<br>▵ iotPort: int<br>▵ qos: int<br>▵ iotHost: String<br>▵ iotTemphost: String<br>▵ messageString: String<br>▵ iotRabbitmq: String<br>▵ iotIbmmq: String<br>▵ iotMosquitto: String<br>▵ iotHivemq: String<br>▵ prop: Properties<br>▵ properties: Properties |
| ⚙ DELLIotSubscriber(String)<br>○ initialize():void<br>○ validateIotSystems():void<br>○ subscribe():void<br>○ reConnect():void<br>○ disConnect():void<br>○ iotSystems():void<br>○ connectionLost(Throwable):void<br>○ messageArrived(MqttTopic,MqttMessage):void |

FIG. 11
1100

| <<Java Class>> |
| :---: |
| © DELLIoTCore |
| com.dell.iotclient |
| ○ dellmqttclient: DELLMqttClient <br> ○ waitTime: long |
| ♂ DELLIoTCore(String,String) <br> ○ DELLMqttClient(String,String,DELLMqttClientPersistence):void <br> ○ DELLMqttClient(String,String,DELLMqttClientPersistence,ScheduledExecutorService):void <br> ○ connect():void <br> ○ connect(MqttConnectOptions):void <br> ○ connectWithResult(MqttConnectOptions) <br> ○ disconnect():void <br> ○ disconnect(long):void <br> ○ disconnectForcibly():void <br> ○ disconnectForcibly(long):void <br> ○ disconnectForcibly(long,long):void <br> ○ disconnectForcibly(long,long,boolean):void <br> ○ subscribe(String):void <br> ○ subscribe(String[]):void <br> ○ subscribe(String,int):void <br> ○ subscribe(String[],int[]):void <br> ○ subscribe(String,IMqttMessageListener):void <br> ○ subscribe(String[],IMqttMessageListener[]):void <br> ○ subscribe)String,int,IMqttMessageListener):void <br> ○ subscribe(String[],int[],IMqttMessageListener[]):void <br> ○ subscribeWithResponse(String):IMqttToken <br> ○ subscribeWithResponse(String,IMqttMessageListener):IMqttToken <br> ○ subscribeWithResponse(String,int):IMqttToken <br> ○ subscribeWithResponse(String,int,IMqttMessageListener):IMqttToken <br> ○ subscribeWithResponse(String[]):IMqttToken <br> ○ subscribeWithResponse(String[],IMqttMessageListener[]):IMqttToken <br> ○ subscribeWithResponse(String[],int[]):IMqttToken <br> ○ subscribeWithResponse(String[],int[],IMqttMessageListener[]):IMqttToken |

- ᵟ unsubscribe(String):void
- ∘ unsubscribe(String[]):void
- ∘ publish(String,byte[],int,boolean):void
- ∘ publish(String,MqttMessage):void
- ∘ setwaitTime(long):void
- ∘ getwaitTime():long
- ∘ close():void
- ∘ close(boolean):void
- ∘ getClientId():String
- ∘ getPendingDeliveryToken():IMqttDeliveryToken[]
- ∘ getServerURI():String
- ∘ getCurrentServerURI():String
- ∘ getTopic(String):MqttTopic
- ∘ isConnected():boolean
- ∘ setCallback(MqttCallback):void
- ∘ setManualAcks(boolean):void
- ∘ messageArrivedComplete(int,int):void

| <<Java Class>><br>©DELLMqttMessage<br>com.dell.iotclient |
|---|
| ○ msgId: int<br>○ msgpayload: byte[]<br>○ changeable: boolean<br>○ qos: int<br>○ kept: boolean<br>○ duplicate: boolean |
| ○ checkQoslevel(int):void<br>♂ DellMqttMessage(byte[])<br>♂ DellMqttMessage()<br>○ getMsgpayload():byte[]<br>○ emptyMsgpayload():void<br>○ setMsgpayload(byte[]):void<br>○ isKept():boolean<br>○ setKept(boolean):void<br>○ getQos():int<br>○ setQos(int):void<br>◇ toString():String<br>○ setChangeable(boolean):void<br>○ checkChangeable():void<br>○ getMsgid():int<br>○ setMsgid(int):void<br>○ isDup():boolean<br>◇ setDup(boolean):void |

INTERNET OF THINGS CONNECTIVITY PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for streamlining connections between elements of an Internet of Things (IoT) computing environment.

BACKGROUND

An IoT environment includes a plurality of connected devices configured to exchange data with each other over one or more networks. Client libraries provide users with necessary software and functionality to build and develop code to integrate and connect their devices and applications on IoT platforms. There are currently many different IoT client libraries, which implement machine-to-machine (M2M) IoT connectivity/messaging protocols, such as, for example, Message Queuing Telemetry Transport (MQTT) protocol. However, the implementations of the different IoT client libraries are not consistent. For example, some MQTT client libraries do not offer bandwidth throttling functionality, which is the intentional increase or decrease of the rate of data acceptance of an internet service provider. Other client libraries offer limited throttling and/or do not offer automatic reconnect. Some client libraries only connect to a limited universe of servers.

The current variability between client libraries results in increased complexity and user confusion in connection with interfacing and the development of interfaces between IoT clients, servers and applications.

SUMMARY

Illustrative embodiments provide techniques for streamlining IoT connectivity with a connectivity layer, which allows IoT clients to seamlessly connect to differently implemented IoT brokers and backend services, thereby overcoming one or more of the above-noted difficulties of conventional practice. For example, by providing a uniform IoT connectivity solution which permits access to various IoT brokers, regardless of platform, some embodiments considerably reduce the amounts of computational and memory resources that are associated with the use of many IoT client libraries inconsistently implementing M2M protocols.

In one embodiment, an apparatus comprises at least one processing platform including a plurality of processing devices. The processing platform is configured to establish a connection between a given one of a plurality of IoT clients and a given one of a plurality of IoT brokers via a connectivity layer providing the plurality of IoT clients with centralized access to the plurality of IoT brokers, and to exchange data between the given one of the plurality of IoT clients and the given one of the plurality of IoT brokers via the connectivity layer.

For example, IoT brokers can correspond to different types of systems and/or platforms running different implementations of M2M protocols, and the processing platform can be configured to enable the exchange of data between any of the IoT clients and any of the different types of IoT brokers. For example, the processing platform can be configured to exchange data between a first IoT client of the plurality of IoT clients and a first IoT broker of the plurality of IoT brokers via the connectivity layer, and to exchange data between a second IoT client of the plurality of IoT clients and the first IoT broker of the plurality of IoT brokers via the connectivity layer, wherein the first and second IoT clients respectively execute different code for data exchange.

In some embodiments, the connection between the given one of the plurality of IoT clients and the given one of the plurality of IoT brokers can be based on a specification of a connection variable comprising, for example, a port and/or a host name associated with the given one of the plurality of IoT brokers. A connection variable can also include an indication of whether a session is to be persistent.

These and other illustrative embodiments include, without limitation, apparatus, systems, methods and computer program products comprising processor-readable storage media.

BRIEF DESCRIPTION OF THE DRAWINGS

FIG. 5 shows example pseudocode for displaying exceptions which occur in an IoT computing environment in an illustrative embodiment.

FIG. 6 shows example pseudocode for validating critical parameters of an IoT server in an IoT computing environment in an illustrative embodiment.

FIG. 7 shows example pseudocode for setting a payload and a quality of service (QoS) level in an IoT computing environment in an illustrative embodiment.

FIG. 8 shows example pseudocode for implementing a message arrived method in an IoT computing environment in an illustrative embodiment.

FIG. 9 shows an example of a class diagram for a publisher class providing IoT clients with an interface to publish to IoT brokers in an illustrative embodiment.

FIG. 10 shows an example of a class diagram for a subscriber class providing IoT clients with an interface to subscribe from IoT brokers in an illustrative embodiment.

FIG. 11 shows an example of a class diagram for providing a variation of method signatures coupled with parameter passing in an illustrative embodiment.

FIG. 12 shows an example of a class diagram for providing functionality to process the payload of an M2M messaging protocol message object in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
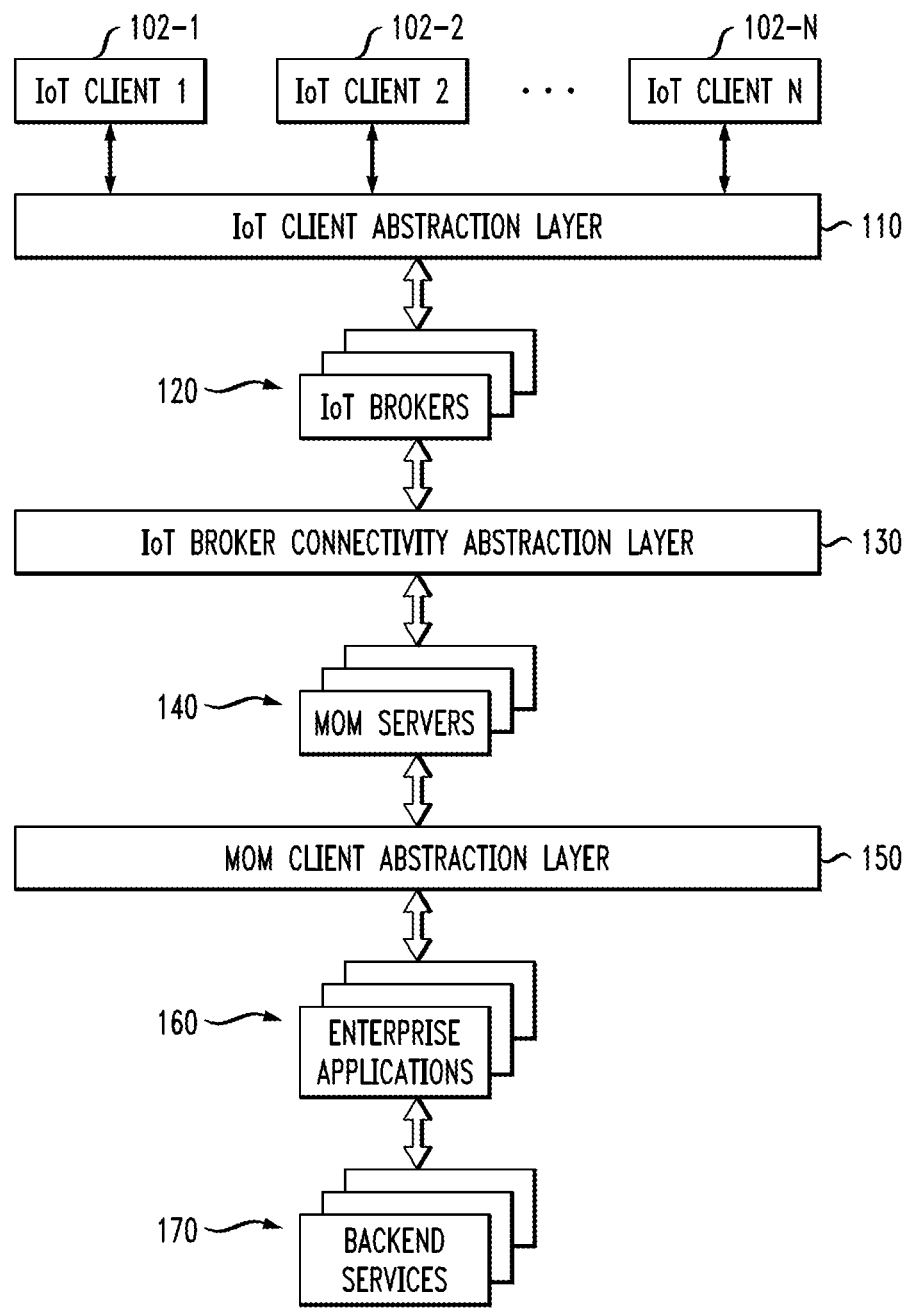
FIG. 1 illustrates an information processing system implementing an IoT connectivity platform, according to an illustrative embodiment.

FIG. 1 shows an information processing system 100 implementing an IoT connectivity platform in accordance with an illustrative embodiment. Information processing system 100 comprises a plurality of IoT clients (e.g., IoT Client 1, IoT Client 2, . . . IoT Client N, respectively denoted by reference numerals 102-1, 102-2, . . . 102-N) operatively coupled (e.g., via one or more communication networks) to an IoT Client Abstraction Layer (ICAL) 110. The ICAL 110 is an example of what is more generally referred to herein as a "connectivity layer," and provides the plurality of IoT clients 102-1, 102-2, . . . 102-N with centralized access to a plurality of IoT brokers 120 and to each other. The one or more communication networks may comprise any of a variety of different types of networks, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks. As described in further detail in connection with FIG. 2, the IoT clients 102-1, 102-2, . . . 102-N can include, for example, mobile devices, smart appliances, and vehicles connected to the one or more communication networks.

An IoT environment includes multiple IoT clients communicating with one or more IoT brokers via one or more M2M IoT connectivity/messaging protocols. An IoT client can be a publisher of and/or a subscriber to information organized as a hierarchy of topics. For example, a publisher with data to distribute sends a message with the data to a connected broker, which distributes the data to those clients having a subscription to that topic.

The plurality of IoT brokers 120 comprise one or more servers which dispatch messages between, for example, the plurality of IoT clients 102-1, 102-2, . . . 102-N and/or from IoT clients 102-1, 102-2, . . . 102-N to one or more message oriented middleware (MOM) servers 140. Messages may be pushed to receivers using one or more IoT brokers 120. For example, a message can be published to an IoT broker by an IoT client. The IoT broker, in turn, sends the message to the IoT clients that have registered to receive messages for the topic to which the message pertains. In some embodiments, IoT clients receive messages based on a subscription to a certain topic. An IoT broker pushes those messages with a topic matching a subscription to the subscribed IoT client. Sending a message is referred to as publishing, and registering to receive messages for a topic is referred to as subscribing. Since communication between IoT clients is topic-based, a relationship is not required between IoT clients in order for a client to receive a message from another client. The ICAL 110 is compatible with each of the plurality of IoT clients 102-1, 102-2, . . . 102-N, and each of the plurality of IoT brokers 120.

The information processing system 100 further includes an IoT Broker Connectivity Abstraction Layer (IBCAL) 130 which is operatively coupled (e.g., via one or more communication networks) between the plurality of IoT brokers 120 and the one or more MOM servers 140. The IBCAL 130 is a connectivity layer providing a centralized interface between the plurality of IoT brokers 120 and one or more MOM servers 140. The IBCAL 130 is compatible with each of the plurality of IoT brokers 120, and each of the one or more MOM servers 140. The one or more MOM servers 140 permit data exchange between distributed applications by sending and receiving messages. The one or more MOM servers 140 include architectures with, for example, application programming interfaces (APIs) and administrative tools to route and deliver messages.

The information processing system 100 further includes a MOM Client Abstraction Layer (MCAL) 150 which is operatively coupled (e.g., via one or more communication networks) between the one or more MOM servers 140 and a plurality of enterprise applications 160. The MCAL 150 is a connectivity layer providing a centralized interface between the one or more MOM servers 140 and a plurality of enterprise applications 160. The MCAL 150 is compatible with each of the one or more MOM servers 140, and each of the plurality of enterprise applications 160. The enterprise applications 160 comprise, for example, (i) platforms for business process automation, which enable communication between different software systems used in an enterprise (e.g., Microsoft® BizTalk); (ii) platforms to provide programming language interoperability (e.g., Microsoft®.NET framework); (iii) platforms to provide support for web applications through, for example, servlets, struts or Java® Server Pages (JSPs) (e.g., Java® applications); and (iv) platforms for programming using certain programming languages (e.g., C, C++) to create, for example, computer applications, firmware, verification software, test code and/or simulators for various applications and hardware products.

The enterprise applications 160 are operatively coupled (e.g., via one or more communication networks) to one or more backend services 170. In accordance with the present disclosure, the one or more backend services 170 can include, for example, database management systems, such as database servers for storing and retrieving data as requested by applications (e.g., SAP® database (SAP America Inc., Newtown Square, Pa.) and Oracle® database (Oracle Corporation, Redwood City, Calif.)). The backend services 170 may also include third-party customer relationship management (CRM) applications providing enterprises with an interface for case and task management (e.g., Salesforce.com® (Salesforce.com Inc., San Francisco, Calif.)), and cloud environments for enterprise solutions including, for example, information management, compliance, and B2B integration (e.g. OpenText™ Cloud (Open Text SA ULC, Halifax, Nova Scotia, Canada)).

Figure 2:
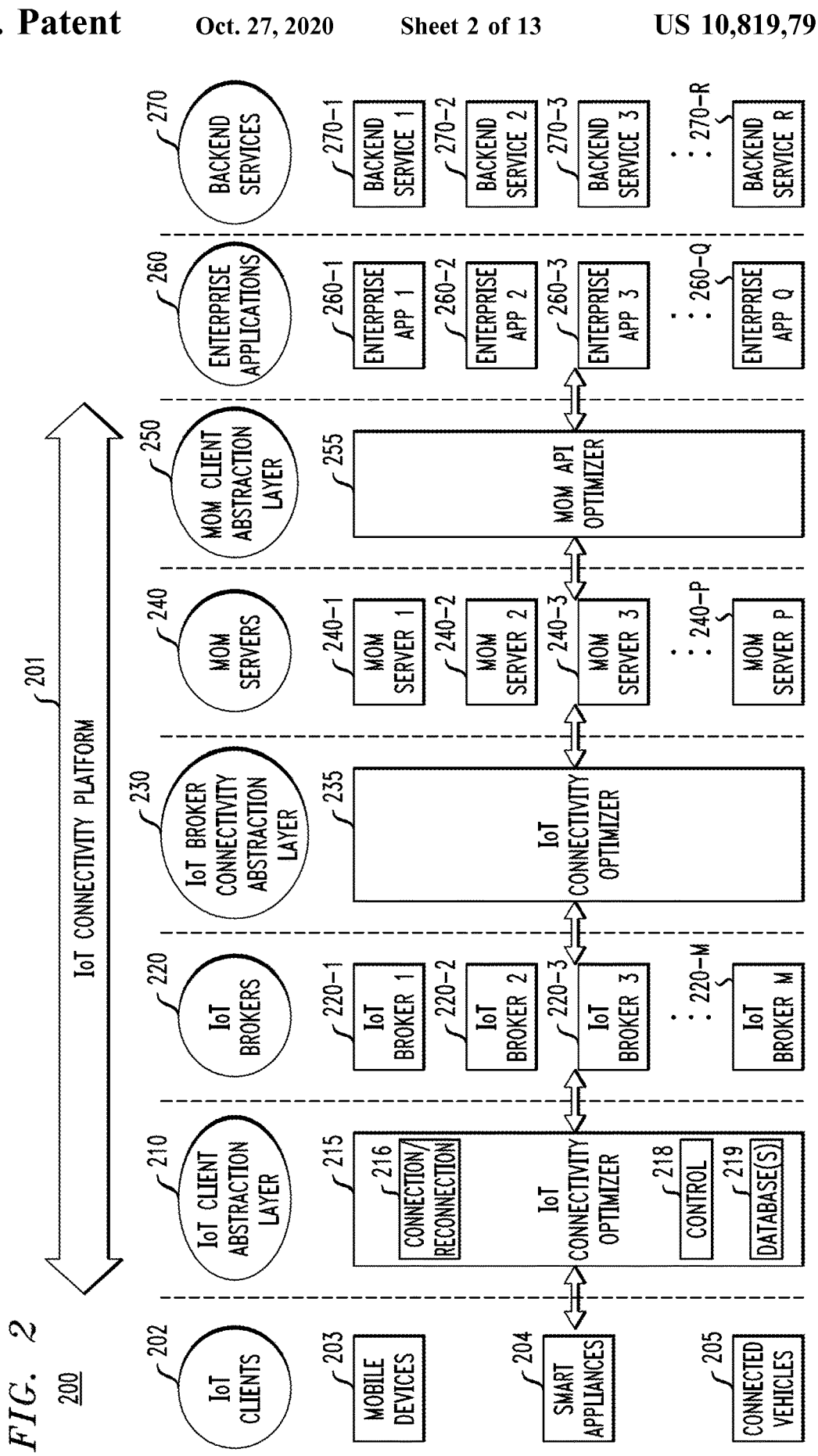
FIG. 2 illustrates a more detailed exemplary architecture for an IoT connectivity platform, according to an illustrative embodiment.

FIG. 2 illustrates a more detailed exemplary architecture for an IoT connectivity platform, according to an illustrative embodiment. A system 200 includes an IoT connectivity platform 201 comprising an ICAL 210 connecting a plurality of IoT clients 202 to a plurality of IoT brokers 220, an IBCAL 230 connecting the plurality of IoT brokers 220 to a plurality of MOM servers 240, and an MCAL 250 connecting the plurality of MOM servers 240 a plurality of enterprise applications 260 and a plurality of backend services 270.

The plurality of IoT clients 202 include, but are not necessarily limited to, one or more mobile devices 203, one or more smart appliances 204 and one or more connected vehicles 205. The mobile devices 203 can include, for example, smart phones, smart watches, tablets, laptops, or other types of network connected mobile computing devices. The smart appliances 204 can include, for example, devices such as refrigerators, stoves, microwaves, printers, washing machines, dryers, dishwashers, cooling devices, heating devices, thermostats, lighting devices, medical devices, security devices and/or gaming devices which are connected to one or more networks and configured to transmit and receive data over the one or more networks. The connected vehicles 205 include, for example, automobiles, trains, airplanes, helicopters, boats, trucks, vans, motorcycles and/or buses which are connected to one or more networks and configured to transmit and receive data over the one or more networks. The data which is transmitted and/or received can include, but is not necessarily limited to, operational, diagnostic, performance, inventory and/or location data so that connected devices can be remotely monitored, analyzed and/or controlled. The IoT clients 202 include integrated technology so that these devices can communicate and interact by transmitting and receiving data over the one or more networks, such as, the Internet.

The IoT clients 202 are operatively coupled to the ICAL 210, which includes an IoT connectivity optimizer 215, which streamlines IoT connectivity. The IoT connectivity optimizer can be an enterprise-based and/or cloud-based computer system. The ICAL 210 including the connectivity optimizer 215 is a vendor agnostic layer, and is, therefore, compatible with a plurality of IoT brokers 220 (e.g., IoT Broker 1, IoT Broker 2, IoT Broker 3, . . . IoT Broker M, respectively denoted by reference numerals 220-1, 220-2, 220-3, . . . 220-M) running on different operating systems and/or platforms or different implementations of the same operating system and/or platforms. In accordance with one or more embodiments, the ICAL 210 enables IoT clients 202 to access any Central IoT Broker (CIB) (e.g., any of IoT brokers 220), wherein the IoT brokers are of different types, and require different functionality or implementations of M2M messaging protocols. In a non-limiting example, the IoT brokers 220 can respectively correspond to different IoT brokers from different sources, which run different software and have different capabilities. Some non-limiting examples of IoT brokers which may be compatible with the ICAL layer 210 including the IoT connectivity optimizer 215 are IBM® IoT MessageSight™ (International Business Machines Corporation, Armonk, N.Y.), Eclipse Mosquitto™ (Eclipse Foundation, Inc., Ottawa, Ontario, Canada), and HiveMQ® (dc-square GmbH, Landshut, Germany). In a non-limiting embodiment, M2M protocols can include, but are not necessarily limited to, MQTT, constrained application protocol (CoAP), and/or OMA lightweight machine to machine (LWM2M).

In accordance with one or more embodiments, instead of having to go through multiple different M2M messaging protocol clients (e.g., MQTT clients) to connect with different IoT brokers, the ICAL 210 is a connectivity layer providing the plurality of IoT clients 202 with centralized access to the plurality of IoT brokers 220. The ICAL 210 can be controlled and operated by a single enterprise. According to one or more embodiments, the IoT connectivity platform 201 provides IoT clients 202 with seamless connections to and from heterogeneous IoT brokers 220, MOM servers 240, enterprise applications 260 and backend services 270. ICAL 210 implements one or more M2M messaging protocols.

In accordance with one or more embodiments, the ICAL 210 is implemented with several Java® classes with multiple methods (e.g., two dozen methods). Although the present disclosure is discussed in connection with Java® implementations, the embodiments are not necessarily limited thereto, and other programming languages may be used.

As used herein, a "class" refers to a defined set of properties common to all objects of one type and from which the objects can be created. A class can include templates that are used to create objects, and to define object data types and methods. For example, in some cases, classes correspond to categories, and objects correspond to the items within each category.

According to an illustrative embodiment, publishing from any of the IoT clients 202 to the IoT brokers 220 is accomplished without modifying code of the IoT client. In other words, when using the ICAL 210, code of an IoT client used for data exchange, and possibly also for connecting to an IoT broker, does not need to be changed to suit a particular IoT broker. The ICAL 210 including the IoT connectivity optimizer 215 eliminates a need to change IoT client code to adapt to different functionalities and/or requirements of different IoT brokers. For example, data can be exchanged between a first IoT client and a first IoT broker, and between a second IoT client and the first IoT broker via the ICAL 210, wherein the first and second IoT clients respectively execute different code for data exchange.

In accordance with one or more embodiments, any of the IoT clients 202 can subscribe to or receive published messages from or send messages to any of the IoT brokers 220 based on a specification of one or more connection variables without any code change. The one or more connection variables comprise, for example, a port and/or a host name associated with a given one of the plurality of IoT brokers. The specification can be made in, for example, an input property file.

Figures 3, 4:
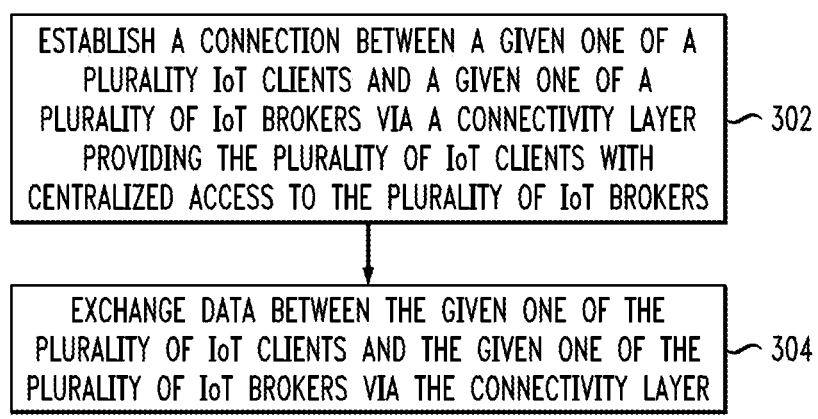
FIG. 3 illustrates a methodology for providing IoT connectivity, according to an illustrative embodiment.
FIG. 4 shows example pseudocode for an initialization process based on one or more connection options in an IoT computing environment in an illustrative embodiment.

FIG. 4 shows example pseudocode 400 for an initialization process based on one or more connection options in an IoT computing environment in an illustrative embodiment. The pseudocode 400 illustrates an initialization method based on connection options, such as, for example, a port, host name and/or a host address associated with a given one of the plurality of IoT brokers 220. In addition, the pseudocode 400 includes calls to check connection status, and proceed with a connection upon determination that connection requirements have been met.

The connection may also be based on a specification of a connection variable comprising an indication of whether a session is to be persistent. For example, when a clean session flag is set to true, the IoT client does not want a persistent session. Connection options may also specify that if the IoT client disconnects for any reason, all information and messages that are queued from a previous persistent session are lost.

FIG. 5 shows example pseudocode 500 for displaying exceptions which occur in an IoT computing environment in an illustrative embodiment. The pseudocode 500 specifies displaying full details of any exception that may occur during the initialization process or other processes. Exception details comprise, for example, a description of the exception, including, but not necessarily limited to, exception reasons, associated reason codes, and exception causes. In connection with the initialization process, an exception may, for example, specify an "unknown host."

FIG. 6 shows example pseudocode 600 for validating critical parameters of an IoT server in an IoT computing environment in an illustrative embodiment. The pseudocode 600 is directed to confirming whether critical parameters of a tuned IoT broker are in a specified range, and taking corrective actions if those parameters are out of the specified range. For example, the checked parameters can include, but are not necessarily limited to, quality of service (QoS) level (e.g., between 0 and 2), a keep alive interval, and/or a connection timeout. A tuned IoT broker implements functionalities such as, for example, a QoS level between 0 and 2, multithreading to realize benefits of a multi-core central processing unit (CPU), dynamic topics and clustering.

A QoS level refers to a level of service associated with the sending and receiving of a message using a messaging protocol (e.g., MQTT). Message delivery may be from a publishing IoT client 202 to an IoT broker 220, and from an IoT broker 220 to a subscribing IoT client 202.

In a non-limiting example, there can be three QoS levels, 0, 1 and 2. A QoS level of 0 refers to a level of service where delivery of a message is not guaranteed, a receiver does not acknowledge receipt of the message, the message is not stored, and a sender does not re-transmit the message. A QoS level of 1 refers to a level of service that guarantees that a message is delivered at least once to a receiver, and a sender stores the message until it receives an acknowledgement of receipt of the message from the recipient. A QoS level of 2 refers to a level of service that guarantees that each message is received only once by the intended recipients. A QoS level of 0 provides the lowest level of service, while a QoS level of 2 provides the highest level of service. A QoS level of 2 is the safest and slowest QoS level.

If, for example, the QoS level is not between 0 and 2, the ICAL 210 may indicate a problem or an exception in a status message.

By way of example, with respect to a keep alive interval, a default connection is closed after each request has been completed, meaning that a server (e.g., a server associated with an IoT broker) closes the connection after delivering a response. In order to keep the connection open for multiple requests, the keep alive interval parameter can be used. If, for example, the keep alive interval is not within a specified range (e.g., 0 seconds to 600 seconds), the ICAL 210 may indicate a problem or an exception in a status message, and then reset the keep alive interval. The resetting of the keep alive interval is performed on the IoT client side. In order to perform a reset on the server side, a client application must be authorized to perform such a reset.

Referring to FIG. 6, following code related to checking whether the keep alive interval is out of range, if the keep alive interval is out of range, the command "System.exit(0)" ensures that an IoT client publisher/subscriber stops with transmission of a message because if transmission is allowed to continue, it will fail later.

With respect to a connection timeout, if, for example, a connection between one or more IoT brokers and one or more IoT clients times out, the ICAL 210 may indicate a problem or an exception, and then reset the connection. The ICAL 210 may generate a status message noting whether one or more IoT clients are connected/not connected, and/or have been reconnected to one or more IoT brokers. An IoT client can also reset a connection and/or QoS level at a server (e.g., server associated with an IoT broker) if sufficient authorization is granted to client applications.

FIG. 7 shows example pseudocode 700 for setting a payload and a QoS level in an IoT computing environment in an illustrative embodiment. Referring to the pseudocode 700 of FIG. 7, a publish method passes a payload, and sets the QoS level. In connection with passing a payload, a "publish( )" API passes the content of a message (payload) which is represented by "message" in the code in FIG. 7.

In accordance with an illustrative embodiment, ICAL 210 including the IoT connectivity optimizer 215 enables an IoT client to set a level of service for the exchange of the data which corresponds to a reliability of a network over which the data is being transmitted. The set level of service for the exchange of the data can also correspond to application logic of the network. For example, there is coordination and evaluation with a network team to fully analyze how the network performs when a QoS level is set because the QoS level will impact network traffic. QoS level=0 is the fastest method and requires only 1 message, but is also the most unreliable transfer mode of the QoS levels. With QoS level=0, the message is not stored on the sender side, and is not acknowledged. The message will be delivered only once, or not at all. Once the message has been sent by an IoT client, the message is deleted from the outbound message queue. Therefore, with this QoS level there is no possibility of duplicate messages. QoS level=1 guarantees that a message will be delivered at least once, but the message may also be delivered more than once. Publishing with QoS level=1 requires 2 messages. The sending application sends a message and waits for an acknowledgement of receipt of the message (referred to as "PUBACK"). If the sending application receives an acknowledgement, then it notifies the client application, and deletes the message from the outbound queue. If the sending application does not receive an acknowledgement, it will resend the message with a duplicate (DUP) flag set. The message will continue to be resent at regular intervals, until an acknowledgement is received.

The IoT clients 202 can specify via the ICAL 210, management of the re-transmission of messages and guarantee delivery even when the underlying transport is not reliable. Message communication over unreliable networks can be facilitated and improved based on QoS level values established via the ICAL 210.

FIG. 8 shows example pseudocode 800 for implementing a message arrived method in an IoT computing environment in an illustrative embodiment. The pseudocode 800 indicates that a message arrived method is called when publication data arrives for an IoT client which matches a subscription topic.

Referring back to FIG. 2, in an illustrative embodiment, the IoT connectivity optimizer 215 centrally includes functionality of a plurality of different IoT client libraries and/or is configured to implement multiple IoT client libraries to connect multiple IoT clients 202 to multiple IoT brokers 220 of different types. The connectivity optimizer 215 programmatically includes connection/reconnection logic 216 including, for example, a plurality of applications, APIs and other functionality to integrate and connect the IoT clients 202 and their applications to multiple IoT brokers 220. In accordance with one or more embodiments, in order to properly connect the IoT client(s) 202 and IoT broker(s) 220 to each other, and facilitate their exchange of data, the connectivity optimizer 215 further includes control logic 218 (i) to analyze and process connection and message publishing requests specifying particular IoT clients and/or IoT brokers; and (ii) to determine subscription information received from IoT clients 202 and/or IoT brokers 220. As explained further herein, connection requests can specify, for example, port and full qualifier host name. The connectivity optimizer 215 further includes or has access to one or more databases 219 storing IoT client 202 and/or IoT broker 220 data, such as, for example, topic, subscription and/or identification information, which can be used to verify IoT client and IoT broker requests and/or communications.

The connectivity optimizer 215 is also configured to be updated dynamically in response to changes in the applications, APIs and/or other functionality required for connecting to one or more of the IoT brokers 220. Such updates can be, for example, dynamically performed to the connectivity optimizer 215 based on existing connections and/or agreements between the connectivity optimizer 215 and the IoT brokers 220, or added to the connectivity optimizer 215 by one or more users.

The IBCAL 230 is a connectivity layer providing a centralized interface between the plurality of IoT brokers 220 and the MOM servers 240 (e.g., MOM Server 1, MOM Server 2, MOM Server 3, . . . MOM Server P, respectively denoted by reference numerals 240-1, 240-2, 240-3, . . . 240-P) running on different operating systems and/or platforms or different implementations of the same operating system and/or platforms. The IBCAL 230 includes an IoT connectivity optimizer 235, which streamlines IoT connectivity, and can be an enterprise-based and/or cloud-based computer system.

In accordance with one or more embodiments, the IBCAL 230 enables IoT brokers 220 to access any MOM server (e.g., any of MOM servers 240), wherein the MOM servers 240 are of different types, and require different functionality or implementations of M2M messaging protocols. In a non-limiting example, the MOM servers 240 can respectively correspond to different MOM servers 240 from different sources, which run different software and have different capabilities. Some non-limiting examples of MOM servers 240 which may be compatible with the IBCAL layer 230 are IBM® MQ (International Business Machines Corporation, Armonk, N.Y.), RabbitMQ® (Pivotal Software, Inc., San Francisco, Calif.), Apache™ActiveMQ® and Apache™ Kafka® (Apache Software Foundation, Wakefield, Mass.). According to one or more embodiments, the one or more MOM servers 240 are operated by a single enterprise.

The IBCAL 230 is compatible with each of the plurality of IoT brokers 220, and each of the MOM servers 240. The MOM servers 240 permit data exchange between distributed applications by sending and receiving messages. The MOM servers 240 include architectures with, for example, APIs and administrative tools to route and deliver messages.

The information processing system 200 further includes an MCAL 250 which is operatively coupled (e.g., via one or more communication networks) between the MOM servers 240 and a plurality of enterprise applications 260 (e.g., Enterprise App 1, Enterprise App 2, Enterprise App 3, . . . Enterprise App Q, respectively denoted by reference numerals 260-1, 260-2, 260-3, . . . 260-Q). The MCAL 250 is a connectivity layer providing a centralized interface between the one or more MOM servers 240 and a plurality of enterprise applications 260. The MCAL 250 is compatible with each of the one or more MOM servers 240, and each of the plurality of enterprise applications 260. Similar to the enterprise applications 160, the enterprise applications 260 comprise, for example, platforms for business process automation, platforms to provide programming language interoperability, platforms to provide support for web applications, and platforms for programming using certain programming languages (e.g., C, C++).

The enterprise applications 260 are operatively coupled (e.g., via one or more communication networks) to one or more backend services 270 (e.g., Backend Service 1, Backend Service 2, Backend Service 3, . . . Backend Service R, respectively denoted by reference numerals 270-1, 270-2, 270-3, . . . 270-R). In accordance with an illustrative embodiment, like the backend services 170, the one or more backend services 270 can include, for example, database management systems, third-party CRM applications, and cloud environments for enterprise solutions.

By seamlessly connecting IoT clients to IoT brokers, MOM servers, enterprise applications and/or backend services, the IoT connectivity platform 201 enables developers to create smart devices and hubs faster, more easily and at lower cost, and shorten the GTM (go to market) for IoT solutions when compared with conventional systems.

In a non-limiting operational example, an agriculture company (AGCO) has a need to remotely control temperature in their greenhouses. AGCO approaches a software company (SWCO) for development, and SWCO uses the IoT connectivity platform 201, which can be offered by an enterprise, to create a new application (NewApp) to control greenhouse temperature. NewApp is an efficient and low cost alternative to current applications. AGCO uses sensors and deploys NewApp on the IoT connectivity platform 201, and SWCO deploys NewApp on a marketplace associated with the IoT connectivity platform 201, where users can view, try, buy, sell and leverage IoT solutions. With time, other agriculture companies (e.g., AGCO2, AGCO3, . . . AGCOz) also realize a need to remotely control greenhouse temperature. The other agriculture companies (e.g., AGCO2, AGCO3, . . . AGCOz) search for an appropriate application in the marketplace associated with the IoT connectivity platform 201, and decide to leverage NewApp.

Each of the information processing systems 100 and 200, including the IoT connectivity platforms described in connection with FIGS. 1 and 2, is assumed to comprise a plurality of processing devices each having a processor coupled to a memory. One or more such processing devices may be implemented at least in part utilizing one or more virtual machines, containers or other types of virtualization infrastructure. Examples of processing platforms implementing the information processing systems 100 and 200 will be described below in conjunction with FIGS. 13 and 14. The IoT connectivity platforms described in connection with FIGS. 1 and 2 (e.g., IoT connectivity platform 201) include ICAL 110/210, IBCAL 130/230 and MCAL 150/250.

At least one of the processing platforms of systems 100 and 200 may more particularly comprise at least a portion of a cloud-based data center or other cloud-based computer system, although other types of processing platforms may be used in other embodiments. For example, in some embodiments, at least one of the processing platforms may comprise an enterprise-based computer system rather than a cloud-based computer system. A given cloud-based implementation of a particular one of the processing platforms illustratively includes commercially-available cloud infrastructure, such as an allocated portion of an AWS system. Other examples of cloud-based systems that can be used to implement one or more processing platforms of systems 100 and 200 include Google Cloud Platform (GCP) and Microsoft Azure®.

A cloud-based system of this type illustratively comprises a Platform-as-a-Service (PaaS) layer overlying an Infrastructure-as-a-Service (IaaS) layer. The IaaS layer may comprise a plurality of virtual machines supporting application containers of the PaaS layer. For example, host devices in such an embodiment illustratively correspond to respective ones of the virtual machines of the IaaS layer.

Each of the one or more processing platforms of systems 100 and 200 may be associated with a plurality of system users. The term "user" in this context and elsewhere herein is intended to be broadly construed so as to encompass, for example, human, hardware, software or firmware entities, as well as various combinations of such entities. At least some of the system users can be associated with various processing devices through which those users interface with various system components. These processing devices associated with system users can include, for example, desktop, laptop or tablet computers, mobile telephones, or other types and arrangements of devices that support user interfaces to functionality of systems 100 and 200.

Storage arrays associated with processing platforms of systems 100 and 200 may comprise, for example, at least one VNX® or Symmetrix VMAX® storage array from Dell EMC of Hopkinton, Mass. Other types of storage arrays that may be used in illustrative embodiments include scale-out all-flash content addressable storage arrays such as XtremIO™ storage arrays, also from Dell EMC.

The operation of the information processing systems 100 and 200 will now be described in further detail with reference to the flow diagram of the illustrative embodiment of FIG. 3. This figure illustrates a process 300 that includes steps 302 and 304, and is suitable for use in system 100 or 200 but is more generally applicable to other types of information processing systems including IoT connectivity platforms.

In step 302, a connection between a given one of a plurality of IoT clients and a given one of a plurality of IoT brokers is established via a connectivity layer providing the plurality of IoT clients with centralized access to the plurality of IoT brokers. For example, the connectivity layer illustratively comprises ICAL 110/210 to connect the IOT clients 102/202 with IoT brokers 120/220.

In step 304, data is exchanged between the given one of the plurality of IoT clients and the given one of the plurality of IoT brokers via the connectivity layer.

In accordance with one or more embodiments, the connection associated with step 302 is based at least in part on a specification of a connection variable comprising, for example, a port and/or a host name associated with the given one of the plurality of IoT brokers. A connection variable can also include an indication of whether a session is to be persistent. The IoT brokers to which the IoT clients are connected can correspond to different types. For example, a first IoT broker is of a first IoT broker type and a second IoT broker is of a second IoT broker type, wherein the first IoT broker type is different from the second IoT broker type.

The exchange of data via the connectivity layer described in connection with step 304 may be between a first IoT client and a first IoT broker, and between a second IoT client and the first IoT broker of the plurality of IoT brokers, wherein the first and second IoT clients respectively execute respective first and second different types of code for data exchange.

The process may include determining whether one or more parameters of the given one of the plurality of IoT brokers associated with step 302 are outside of a predetermined range, and performing one or more corrective actions is response to an affirmative determination.

In accordance with one or more embodiments, a QoS level for the exchange of the data associated with step 304 is able to be set. In a non-limiting example, the set QoS level requires single transmission of a message including the data, and guarantees delivery of the data. The set QoS level may require storage of a message including the data at least until an acknowledgment of receipt of the data is received and/or may guarantee that a message including the data is received only once by an intended recipient of the data.

According to the present disclosure, in addition to the connectivity layer discussed in connection with steps 302 and 304, a second connectivity layer (e.g., IBCAL 130/230) provides a centralized interface between the plurality of IoT brokers and a plurality of MOM servers. The second connectivity layer is compatible with each of the plurality of IoT brokers, and each of the plurality of MOM servers.

According to the present disclosure, in addition to the connectivity layer discussed in connection with steps 302 and 304, a third connectivity layer (e.g., MCAL 150/250) provides a centralized interface between the plurality of MOM servers and a plurality of enterprise applications. The third connectivity layer is compatible with each of the plurality of MOM servers, and each of the plurality of enterprise applications.

Each of the connectivity layers (e.g., ICAL, IBCAL and MCAL) may implement a plurality of machine-to-machine messaging protocols.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for implementing IoT connectivity. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated IoT connectivity processes within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A class diagram is an illustrative tool used to illustrate relationships among classes (e.g., Java® classes) that make up an application. Using Unified Modeling Language (UML), class diagrams typically include class names, class variables and class operations. For example, the UML representation of a class is illustratively shown as a rectangle containing top, middle and bottom sections vertically stacked. The top section includes the class name, the middle section includes the class variables, and the bottom section includes the class operations. The class diagrams in FIGS. 9-12 provide further detail of the different functionalities provided by the ICALs 110/210 as discussed in detail herein.

FIG. 9 shows an example of a class diagram 900 for a publisher class providing IoT clients (e.g., IoT clients 202) with an interface to publish to IoT brokers (e.g., IoT brokers 220) in an illustrative embodiment.

FIG. 10 shows an example of a class diagram 1000 for a subscriber class providing IoT clients (e.g., IoT clients 202) with an interface to subscribe from IoT brokers (e.g., IoT brokers 220) in an illustrative embodiment.

FIG. 11 shows an example of a class diagram 1100 for providing a variation of method signatures coupled with parameter passing in an illustrative embodiment, so as to increase the functionalities of the interfaces between IoT clients and IoT brokers for publishing/subscribing to/from IoT brokers.

FIG. 12 shows an example of a class diagram 1200 for providing functionality to process the payload of an M2M messaging protocol (e.g., MQTT) message object in an illustrative embodiment.

It should be noted that the particular arrangements illustrated in FIGS. 1 through 12 are presented by way of illustrative example only, and should not be construed as limiting in any way. As noted above, the described functionality for IoT connectivity can be implemented using additional or alternative components, and in other processing contexts. Accordingly, a wide variety of different IoT connectivity arrangements can be used in other embodiments.

The illustrative embodiments described above provide significant advantages over conventional arrangements. For example, some embodiments streamline IoT connectivity stacks by introducing a vendor agnostic layer, such as, for example, ICAL 110/210, which permits IoT clients to access any CM from any vendor, and seamlessly connect to heterogeneous MOM backend services. In contrast, in conventional arrangements, there are many IoT client libraries, which separately and inconsistently implement M2M protocols. In conventional architectures, connections between IoT clients and IoT brokers are among numerous independently operating and non-uniform IoT connectivity protocols. The embodiments instead provide a customized uniform IoT message oriented connectivity solution which allows IoT clients to access any IoT broker, regardless of the broker's platform.

Moreover, illustrative embodiments can provide significant advantages by enabling IoT client subscriptions to any IoT broker and publishing to any MOM server with little or no IoT client code modifications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement at least portions of IoT connectivity functionality as disclosed herein will now be described in greater detail with reference to FIGS. 13 and 14. Although described in the context of systems 100 and 200, these platforms may also be used to implement at least portions of other information processing systems in other embodiments.

Figure 13:
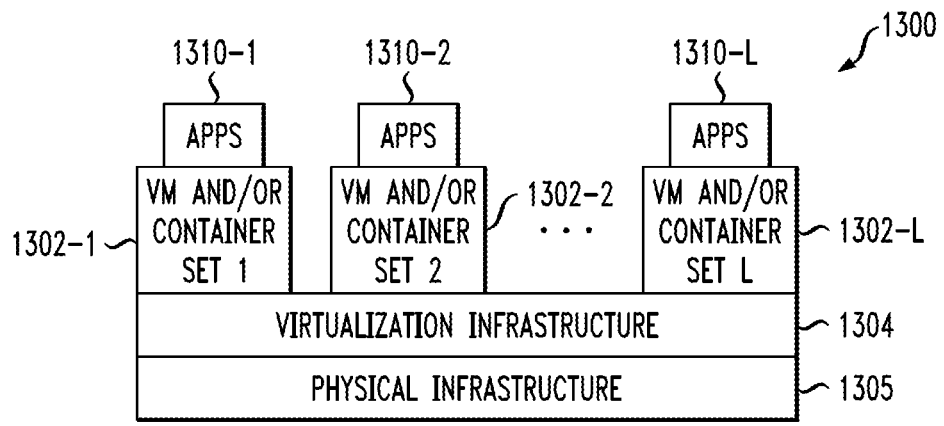
FIGS. 13 and 14 show examples of processing platforms that may be utilized to implement at least a portion of an information processing system in illustrative embodiments.
Figure 14:
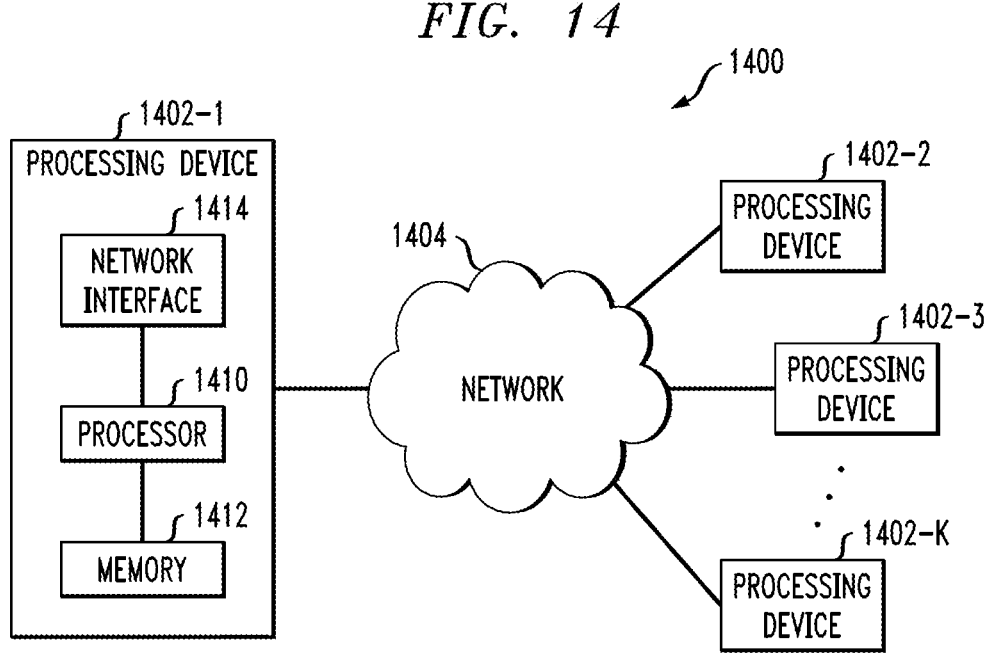

FIG. 13 shows an example processing platform comprising cloud infrastructure 1300. The cloud infrastructure 1300 comprises a combination of physical and virtual processing resources that may be utilized to implement at least a portion of the information processing system 100 or 200. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide IoT-based connectivity functionality of the type described above at least in part utilizing processes running on the VMs. For example, different ones of the VMs can implement different portions of the IoT connectivity platform 201 in the system 200.

An example of a hypervisor platform that may be used to implement a hypervisor within the virtualization infrastructure 1304 is the VMware® vSphere® which may have an associated virtual infrastructure management system such as the VMware® vCenter™. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can provide IoT connectivity functionality of the type described above at least in part utilizing processes running on the containers. For example, a container host device supporting multiple containers of one or more container sets can implement different portions of the IoT connectivity platform 201 in the system 200.

As is apparent from the above, one or more of the processing modules or other components of systems 100 and 200 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 or 200 and includes a plurality of processing devices, denoted 1402-1, 1402-2, 1402-3, ... 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a CPU, a graphics processing unit (GPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and systems 100 and 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of an information processing system providing IoT connectivity functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems comprising different arrangements of processing platforms, networks, IoT connectivity layers, IoT clients, IoT brokers, MOM servers, enterprise applications and backend services. Also, the particular configurations of system and device elements and associated IoT connectivity processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices;
   said at least one processing platform being configured:
   to establish a first connection between a first Internet of Things (IoT) client of a plurality of IoT clients and a given one of a plurality of IoT brokers via a connectivity layer providing the plurality of IoT clients with centralized access to the plurality of IoT brokers;
   to establish a second connection between a second IoT client of the plurality of IoT clients and the given one of the plurality of IoT brokers via the connectivity layer;
   to exchange first data between the first IoT client and the given one of the plurality of IoT brokers via the connectivity layer; and
   to exchange second data between the second IoT client and the given one of the plurality of IoT brokers via the connectivity layer;
   wherein the first and second IoT clients respectively utilize first and second protocols for data exchange, the first and second protocols being different than a protocol for data exchange used by the given one of the plurality of IoT brokers; and wherein the connectivity layer is compatible with a plurality of different protocols for data exchange used by the plurality of IoT clients and by the plurality of IoT brokers to enable at least the first and second IoT clients to exchange the first and second data with the given one of the plurality of IoT brokers while maintaining the first and second protocols for data exchange used by the first and second IoT clients and the protocol for data exchange used by the given one of the plurality of IoT brokers.

2. The apparatus of claim 1 wherein the connection is based at least in part on a specification of a connection variable comprising at least one of a port and a host name associated with the given one of the plurality of IoT brokers.

3. The apparatus of claim 1 wherein the connection is based at least in part on a specification of a connection variable comprising an indication of whether a session is to be persistent.

4. The apparatus of claim 1 wherein a first IoT broker of the plurality of IoT brokers is of a first IoT broker type and a second IoT broker of the plurality of IoT brokers is of a second IoT broker type, wherein the first IoT broker type is different from the second IoT broker type.

5. The apparatus of claim 1 wherein said at least one processing platform is further configured:
to determine whether one or more parameters of the given one of the plurality of IoT brokers are outside of a predetermined range; and
to perform one or more actions is response to an affirmative determination.

6. The apparatus of claim 1 wherein said at least one processing platform is further configured to set a quality of service level for the exchange of at least one of the first data and the second data.

7. The apparatus of claim 6 wherein the set quality of service level requires single transmission of a message including at least one of the first data and the second data.

8. The apparatus of claim 6 wherein the set quality of service level guarantees delivery of at least one of the first data and the second data.

9. The apparatus of claim 8 wherein the set quality of service level requires storage of a message including at least one of the first data and the second data at least until an acknowledgment of receipt of at least one of the first data and the second data is received.

10. The apparatus of claim 6 wherein the set quality of service level guarantees that a message including at least one of the first data and the second data is received only once by an intended recipient of at least one of the first data and the second data.

11. The apparatus of claim 1 wherein said at least one processing platform is further configured to provide a centralized interface between the plurality of IoT brokers and a plurality of message oriented middleware (MOM) servers via a second connectivity layer, and wherein the second connectivity layer is compatible with each of the plurality of IoT brokers, and each of the plurality of MOM servers.

12. The apparatus of claim 11 wherein said at least one processing platform is further configured to provide a centralized interface between the plurality of MOM servers and a plurality of enterprise applications via a third connectivity layer, and wherein the third connectivity layer is compatible with each of the plurality of MOM servers, and each of the plurality of enterprise applications.

13. The apparatus of claim 1 wherein the connectivity layer implements a plurality of machine-to-machine messaging protocols.

14. A method comprising:
establishing a first connection between a first Internet of Things (IoT) client of a plurality of IoT clients and a given one of a plurality of IoT brokers via a connectivity layer providing the plurality of IoT clients with centralized access to the plurality of IoT brokers;
establishing a second connection between a second IoT client of the plurality of IoT clients and the given one of the plurality of IoT brokers via the connectivity layer;
exchanging first data between the first IoT client and the given one of the plurality of IoT brokers via the connectivity layer; and
exchanging second data between the second IoT client and the given one of the plurality of IoT brokers via the connectivity layer;
wherein the first and second IoT clients respectively utilize first and second protocols for data exchange, the first and second protocols being different than a protocol for data exchange used by the given one of the plurality of IoT brokers;
wherein the connectivity layer is compatible with a plurality of different protocols for data exchange used by the plurality of IoT clients and by the plurality of IoT brokers to enable at least the first and second IoT clients to exchange the first and second data with the given one of the plurality of IoT brokers while maintaining the first and second protocols for data exchange used by the first and second IoT clients and the protocol for data exchange used by the given one of the plurality of IoT brokers; and
wherein the method is performed by at least one processing platform comprising at least one processing device comprising a processor coupled to a memory.

15. The method of claim 14 wherein a first IoT broker of the plurality of IoT brokers is of a first IoT broker type and a second IoT broker of the plurality of IoT brokers is of a second IoT broker type, wherein the first IoT broker type is different from the second IoT broker type.

16. The method of claim 14 further comprising providing a centralized interface between the plurality of IoT brokers and a plurality of message oriented middleware (MOM) servers via a second connectivity layer, and wherein the second connectivity layer is compatible with each of the plurality of IoT brokers, and each of the plurality of MOM servers.

17. A computer program product comprising a non-transitory processor-readable storage medium having stored therein program code of one or more software programs, wherein the program code when executed by at least one processing platform causes said at least one processing platform:
to establish a first connection between a first Internet of Things (IoT) client of a plurality of IoT clients and a given one of a plurality of IoT brokers via a connectivity layer providing the plurality of IoT clients with centralized access to the plurality of IoT brokers;
to establish a second connection between a second IoT client of the plurality of IoT clients and the given one of the plurality of IoT brokers via the connectivity layer;
to exchange first data between the first IoT client and the given one of the plurality of IoT brokers via the connectivity layer; and
to exchange second data between the second IoT client and the given one of the plurality of IoT brokers via the connectivity layer;

wherein the first and second IoT clients respectively utilize first and second protocols for data exchange, the first and second protocols being different than a protocol for data exchange used by the given one of the plurality of IoT brokers; and wherein the connectivity layer is compatible with a plurality of different protocols for data exchange used by the plurality of IoT clients and by the plurality of IoT brokers to enable at least the first and second IoT clients to exchange the first and second data with the given one of the plurality of IoT brokers while maintaining the first and second protocols for data exchange used by the first and second IoT clients and the protocol for data exchange used by the given one of the plurality of IoT brokers.

18. The computer program product of claim 17 wherein a first IoT broker of the plurality of IoT brokers is of a first IoT broker type and a second IoT broker of the plurality of IoT brokers is of a second IoT broker type, wherein the first IoT broker type is different from the second IoT broker type.

19. The computer program product of claim 17 wherein the program code further causes said at least one processing platform to provide a centralized interface between the plurality of IoT brokers and a plurality of message oriented middleware (MOM) servers via a second connectivity layer, and wherein the second connectivity layer is compatible with each of the plurality of IoT brokers, and each of the plurality of MOM servers.

20. The computer program product of claim 19 wherein the program code further causes said at least one processing platform to provide a centralized interface between the plurality of MOM servers and a plurality of enterprise applications via a third connectivity layer, and wherein the third connectivity layer is compatible with each of the plurality of MOM servers, and each of the plurality of enterprise applications.

* * * * *